(12) United States Patent
Abedi

(10) Patent No.: US 8,704,656 B2
(45) Date of Patent: Apr. 22, 2014

(54) IMPROVEMENTS TO BODY AREA NETWORKS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/254,090

(22) PCT Filed: Feb. 1, 2010

(86) PCT No.: PCT/GB2010/050153
§ 371 (c)(1),
(2), (4) Date: Dec. 14, 2011

(87) PCT Pub. No.: WO2010/100442
PCT Pub. Date: Sep. 10, 2010

(65) Prior Publication Data
US 2012/0092155 A1    Apr. 19, 2012

(30) Foreign Application Priority Data
Mar. 4, 2009   (EP) .................................... 09154330

(51) Int. Cl.
*G08B 1/08* (2006.01)
(52) U.S. Cl.
USPC ............... 340/539.12; 340/539.1; 340/573.1
(58) Field of Classification Search
USPC ......... 340/539.12, 539.11, 539.1, 573.1, 3.1,
340/5.61, 286.07, 286.01, 286.02; 370/310,
370/339, 347; 455/67.11
See application file for complete search history.

(56) References Cited

U.S. PATENT DOCUMENTS

| 8,395,498 B2 * | 3/2013 | Gaskill et al. ............ 340/539.12 |
| 2005/0221821 A1 | 10/2005 | Sokola et al. |
| 2006/0031378 A1 | 2/2006 | Vallapureddy et al. |
| 2006/0092907 A1 | 5/2006 | Shimokawa et al. |
| 2007/0258395 A1 * | 11/2007 | Jollota et al. .................. 370/310 |

FOREIGN PATENT DOCUMENTS

WO   2007/083586   7/2007

OTHER PUBLICATIONS

Tetsuya Kawai, et al., "Proposal of an Assured Corridor Mechanism for Urgent Information Transmission in Wireless Sensor Networks," IEICE Trans. Commun., vol. E90-B, No. 10, Oct. 2007.
A. El-Hoiydi, et al, "WiseMAC: An Ultra Low Power MAC Protocol for the Downlink of Infrastructure Wireless Sensor Networks," ISCC, pp. 244-251, Jun. 2004.
IEEE 802.15.4-2006 Standard, Sep. 8, 2003.
IEEE 802.15.3-2003 Standard, Sep. 29, 2003.

(Continued)

Primary Examiner — Anh V La
(74) Attorney, Agent, or Firm — Staas & Halsey LLP

(57) ABSTRACT

A method of operating a wireless sensor network having a plurality of network devices including sensors (11E, 13) for monitoring a plurality of parameters, and a coordinator (10) for communicating with the network devices either directly in a star protocol or indirectly in a peer-to-peer protocol, the method comprising: arranging the coordinator (10) for communication over a low-priority link with at least a subset of the network devices; gathering sensor data by sensors of the network devices and transferring the data to the coordinator; detecting existence of an emergency state with respect to at least one of the network devices (11E); and establishing a high-priority link with the devices (11E) in the emergency state, the high-priority link having higher priority for network resources than the low-priority link. The method may be applied, for example, to monitoring of patients in a hospital using MBANs operating in accordance with IEEE 802.15.6.

13 Claims, 14 Drawing Sheets

(56) References Cited

OTHER PUBLICATIONS

IEEE 802.15.6 Standard, Jun. 2011.
European Search Report issued Sep. 2, 2009 in European Application No. 09154330.6-2412.
International Search Report issued Mar. 19, 2010 in PCT/GB2010/050153.
Korean Office Action mailed Jan. 21, 2013 in corresponding Korean Patent Application No. 10-2011-7023350.

* cited by examiner

| Bits: 0 - 2 | 3 | 4 | 5 | 6 | 7 - 9 | 10 - 11 | 12 - 13 | 14 - 15 |
|---|---|---|---|---|---|---|---|---|
| Frame Type | Security Enabled | Frame Pending | Ack. Request | PAN ID Compression | Reserved | Dest. Addressing Mode | Frame Version | Source Addressing Mode |
| 51 | 52 | 53 | 54 | 55 | 56 | 57 | 58 | 59 |

| Frame type value b2 b1 b0 | Description |
|---|---|
| 000 | Beacon |
| 001 | Data |
| 010 | Acknowledgment |
| 011 | MAC command |
| 100 - 111 | Reserved |

Frame Control: 500

| Bits: 0 - 2 | 3 | 6 | 7 | 8 | 9 | 10 - 11 | 12 - 13 | 14 - 15 |
|---|---|---|---|---|---|---|---|---|
| Frame Type | Security Enabled | Frame Pending/ More Data | Emergency | Ack. Policy | PAN ID compression | Destination Addressing Mode | Frame Version | Source Addressing Mode |
| 501 | 502 | 503 | 504 | 505 | 506 | 507 | 508 | 509 |

Fig. 20

| Frame Type Value (3 bits) | Description |
|---|---|
| 000 | Beacon frame |
| 001 | Data frame |
| 010 | ACK |
| 011 | MAC command |
| 100, 101, 110 | Reserved |
| 111 | Emergency |

501

IMPROVEMENTS TO BODY AREA NETWORKS

CROSS REFERENCE TO RELATED APPLICATIONS

This application is a national phase application, under 35 U.S.C. 371, of international application No. PCT/GB2010/050153, filed on Feb. 1, 2010, which claimed priority to European Patent Application No. 09154330.6, filed on Mar. 4, 2009, the disclosures of which are incorporated herein by reference.

FIELD OF THE INVENTION

The present invention relates to wireless sensor networks including personal area networks and particularly, but not exclusively, to body area networks including wirelessly-communicating sensors disposed on or around, or implanted in, human or animal bodies.

BACKGROUND OF THE INVENTION

Various types of wireless sensor network have been proposed. Among these, the so-called Body Area Network or BAN is an example of wireless personal area networks (WPANs), used to convey information over relatively short distances. Unlike wireless local area networks (WPANs), connections effected via WPANs involve little or no infrastructure. This feature allows small, power-efficient, inexpensive solutions to be implemented for a wide range of devices. Of particular interest is the possibility of the medical BAN (MBAN) in which sensors are used to monitor the status of one or more patients. A BAN employing mainly sensors for feeding sensed data to a data sink is an example of a wireless sensor network (WSN); however, more active devices, such as actuators, may be also be included in a MBAN.

IEEE Standard 802.15.4 defines the physical layer (PHY) and medium access control (MAC) sublayer specifications for low data-rate WPANs. IEEE 802.15.4 has some similarities with a standard for higher data-rate WPANs, IEEE 802.15.3. The documents IEEE Std 802.15.4-2006 and IEEE Std 802.15.3-2003 are hereby incorporated by reference in their entirety.

WPANs of the type envisaged in IEEE 802.15.4 are suitable for applications such as industrial monitoring, but do not offer the kind of data reliability required for MBANs. In medical applications, there is a requirement to reduce the costs associated with human labour while increasing the reliability and process automation and reducing human error. Sensors can provide the required intelligence, and already are widely employed in medical equipment. This includes hospital recuperative care, home care, intensive care units and advanced surgical procedures. There are many different types of sensors employed for medical applications, including external sensors for pulse, temperature etc., sensors which come in contact with body fluids, sensors used in catheters (through incision), sensors for external applications, disposable skin patches with wireless sensors, and implantable sensors.

A WPAN of one or more sensors around each of the patients in a hospital or medical ward could provide multiple clinical benefits including patient mobility, monitoring flexibility, extension of monitoring into care areas that are currently unmonitored, reduced clinical errors and reduced overall monitoring costs. Body worn sensors may include various sensor types on a single patient body. They require a capability to be applied or removed quickly from the patient's body.

On an individual basis, such sensors may have bit rates of as low as 1-2 kbps per patient and on an aggregate basis they may require a 10 kbps bit rate. A range of as little as a few meters may be adequate. However, medical WSN applications are mission critical applications in the clinical environment. Robust wireless links for bounded data loss and bounded latency, capacity for patient and sensor density, coexistence with other radios, battery life for days of continuous operations and small form factors for body worn devices, are among the requirements for medical WSNs or MBANs. These requirements can be satisfied through utilization of techniques such as diversity and error control techniques in the time and frequency domain, including Forward Error Correction (FEC) and Adaptive Repeat reQuest (ARQ), low duty cycle TDMA for sensor information rate, and more efficient small antennas.

Efforts are therefore in progress to define a further standard IEEE 802.15.6 which aims to define the properties of Body Area Networks, particularly for medical applications. One of the major requirements of IEEE 802.15.6 is high reliability and improved quality-of-service (QoS) when devices involved in a medical application actively transmit the data through the wireless sensor network under emergency situations. Consequently traffic congestion management and data/link prioritisation is important to enable wireless medical BAN devices to suitably manage QoS for supporting medical emergency communications. Current IEEE standards such as IEEE 802.15.3 and IEEE 802.15.4 do not include adequate traffic congestion management mechanisms for wireless medical BAN/WSN.

SUMMARY OF THE INVENTION

According to a first aspect of the present invention, there is provided a network device for use in a wireless sensor network having a plurality of network devices including sensors for monitoring one or more parameters, and a coordinator capable of conducting communications with the network devices over a low-priority link or a high-priority link, wherein the network device comprises: recognising means for recognising whether the network device is in an emergency state; and responding means responsive to recognition of the emergency state to establish a high-priority link with the coordinator.

High-priority link means a link having higher priority for allocation of network resources compared with the low-priority link It may be a different mode or topology from the low-priority link, for example a star topology where possible rather than a peer-to-peer topology, and/or a beacon-mode link rather than a non beacon-mode. The high-priority link may involve a guaranteed time slot (GTS) in a TDMA-based resource allocation scheme, the low-priority link normally having no such GTS.

Generally, the network will initially have low-priority links only and establishing the high-priority link with the device in the emergency state will involve replacing an existing low-priority link with that device by a new high-priority link, the other devices not in emergency being served, as before, by low-priority links. However, as an alternative it would be possible for the network to start with high-priority links and to downgrade the links for the devices not in emergency to low-priority links, leaving the high-priority link(s) in place for the device(s) in emergency.

Thus, according to a modification of the first aspect of the present invention, there is provided a network device for use in a wireless sensor network having a plurality of network devices including sensors for monitoring one or more parameters, and a coordinator capable of conducting communications with the network devices over a low-priority link or a high-priority link, wherein the network device comprises: recognising means for recognising that another network device is in an emergency state whilst the network device itself is not in an emergency state; and responding means responsive to such recognition to establish a low-priority link with the coordinator.

The recognition of the emergency state may be based, for example, on a value of a parameter sensed by a sensor of the network device or of some other network device. In this case, "emergency state" refers to an emergency condition of a parameter of some entity (such as a living body) being monitored. The network device may be one of a plurality of network devices assigned to monitoring the same entity, in which case the emergency state may be determined in accordance with the level of a parameter sensed by the network device or by any of the network devices assigned to the same entity. The existence or non-existence of the emergency state is preferably determined based on a critical level of one or more parameters sensed by sensors of the network devices. That is, for example, it is detected whether a sensed value of a parameter has crossed the critical level.

As well as being equipped with a sensor, each network device may act as a relay for peer-to-peer communications over a high-priority link or a low-priority link of at least one other network device. If so then, preferably, the recognising means are further operable to recognise whether each the other network device is also in the emergency state, and the responding means may be further responsive to recognition of the emergency state with respect to the network device itself to maintain, modify or drop the peer-to-peer communications in dependence upon at least whether each other network device is in the emergency state.

This may include the responding means maintaining, modifying or dropping the peer-to-peer communications in further dependence upon at least one of a QoS or congestion level of the high-priority link and availability of power to the network device.

It may include modifying peer-to-peer communications over a low-priority link with another the network device which is not in the emergency state by reducing a rate thereof. Instead, or in addition, the responding means may be arranged to drop peer-to-peer communications over a low-priority link with another network device which is not in the emergency state. On the other hand, preferably, the responding means are arranged to maintain peer-to-peer communications over a high-priority link with each connected network device in the emergency state.

The network device may further comprise a counter to keep a count of a number of the other network devices for which the network device itself is acting as a relay, the responding means being further responsive to recognition of the emergency state to refuse a request to act as relay for a further network device in dependence upon the current value of the count.

According to a second aspect of the present invention, there is provided a coordinator in a wireless sensor network having a plurality of network devices, wherein the coordinator is arranged for communication with each of the network devices over a high-priority link or a low-priority link, the high-priority link having higher priority for resources in the network than the low-priority link, and the coordinator comprising means responsive to declaration of an emergency state with respect to any of the network devices to establish a high-priority link with that network device.

According to a third aspect of the present invention, there is provided a wireless sensor network having a plurality of network devices including sensors for monitoring a plurality of parameters, and a coordinator for communicating with the network devices either directly in a star protocol or indirectly in a peer-to-peer protocol, wherein the coordinator is arranged for communication over a low-priority link with at least a subset of the network devices and is responsive to a determination of the existence of an emergency state of one or more of the network devices to establish a high-priority link with the one or more of the devices, the high-priority link having higher priority for network resources than the low-priority link.

In any of the above aspects, the emergency state with respect to a network device may be recognised when a parameter being sensed by a sensor of the network device reaches a critical value. This can occur in a number of ways, and may be determined wholly in the network device itself, or may be determined outside and notified to the network device.

In a preferred application of each of the above aspects of the invention, at least some of the network devices are applied to monitoring medical parameters of a living body. In this application, "emergency state" implies a medical emergency of the living body (e.g. patient) being monitored.

The above aspects can be applied either to frequency-division or time-division (or both) wireless communication systems. In the latter case, for example, the network resources are structured in a time-division manner to define one or more time slots per unit period, and one or more of the time slots are reserved for use in the high-priority link. In addition, the network resources may be further structured to define a contention access period per unit period for use by at least the low-priority link. Alternatively, a distinction between high-priority link and low-priority link may be made using beacon-mode or non beacon-mode communication respectively.

The wireless sensor network will typically be one in which information is wirelessly transmitted within the network within unit periods in the form of frames each having a frame control field, in which case the declaration of the emergency state may be made by setting a value in the frame control field to a predefined value.

Preferably, the frames include frames of different types, and the predefined value denotes an emergency frame type. The frame control field may include at least one bit for signalling existence or non-existence of the emergency condition.

Such a frame-based network can include a IEEE 802.15.6-based MBAN. In a preferred application, the above-mentioned entities are living bodies, each sensor is for sensing a life parameter of the living body of a patient, and the emergency state is a medical emergency.

According to a fourth aspect of the present invention, there is provided a method of operating a wireless sensor network having a plurality of network devices including sensors for monitoring a plurality of parameters, and a coordinator for communicating with the network devices either directly in a star protocol or indirectly in a peer-to-peer protocol, the method comprising:

arranging the coordinator for communication over a low-priority link with at least a subset of the network devices;

gathering sensor data by sensors of the network devices and transferring the data to the coordinator;

detecting existence of an emergency state with respect to at least one of the network devices;

establishing a high-priority link with the at least one of the devices in the emergency state, the high-priority link having higher priority for network resources than the low-priority link; and when the device is acting as a relay for low-priority links with other devices, maintaining, modifying or dropping those low-priority links in dependence upon whether or not the other devices are in emergency, a level of congestion or QoS of the high-priority link, and/or the electrical power available.

Further aspects of the present invention provide software which, when executed by a processor of a network device or a coordinator of a wireless sensor network, provides the above network device or coordinator, respectively. Such software may be stored on a computer-readable medium.

Embodiments of the present invention provide link prioritisation and traffic congestion management mechanisms (traffic management protocols) for Wireless Medical BANs/WSNs. In particular, protocols may be provided for maintaining high level of QoS and managing wireless links as well as traffic congestion in such a wireless sensor network which is transporting data to/from sensor/actuator devices that are attached to a patient who is in a medical emergency condition.

BRIEF DESCRIPTION OF THE DRAWINGS

For a better understanding of the present invention, and to show more clearly how it may be carried into effect, reference will now be made, by way of example only, to the following drawings in which:

FIG. 10 shows the structure of a Frame Control field in the frame format of FIG. 9;

FIG. 11 is a table of hitherto-defined values of frame type bits in the Frame Control field of FIG. 10;

FIG. 19 shows a Frame Control field used to indicate an emergency state in an embodiment of the present invention; and FIG. 20 is a table of possible values of frame type bits in the Frame Control field of FIG. 19.

DISCLOSURE OF THE INVENTION

Figure 1:
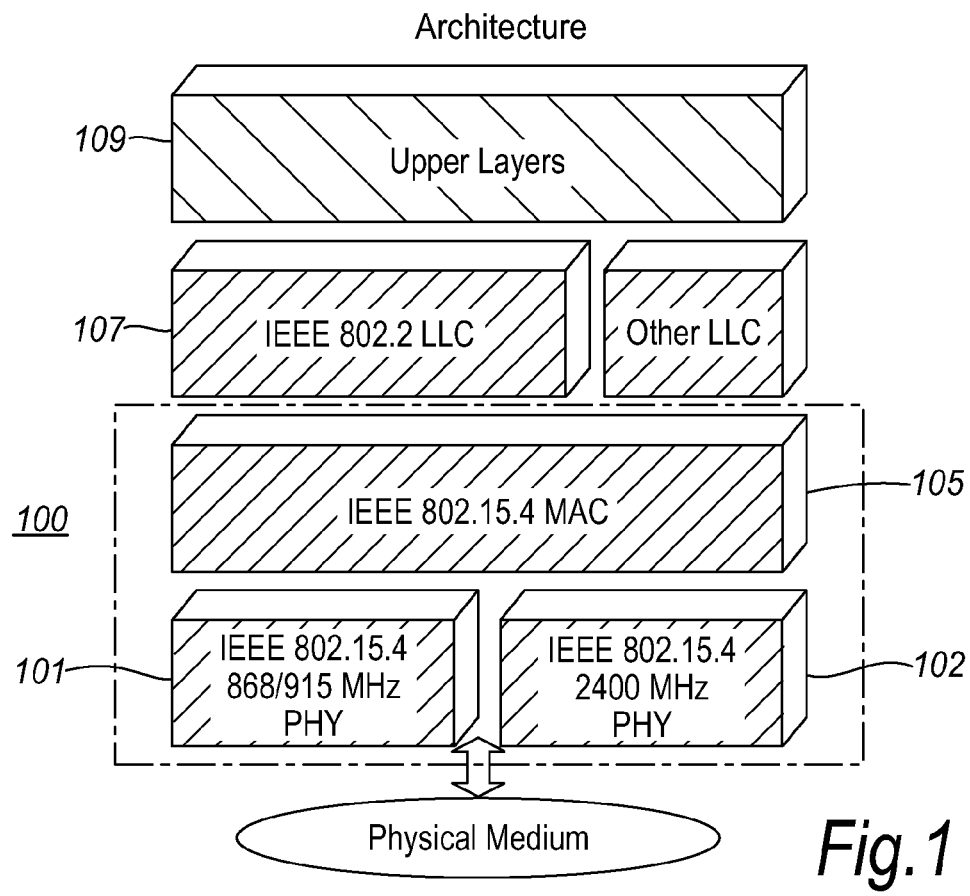
FIG. 1 illustrates protocol layers in an IEEE 802.15.4 WPAN.

Before explaining the embodiments of the present invention, some background explanation will first be given of multiple access protocols used in wireless networks, followed by a summary of those parts of IEEE 802.15.4 which are expected to have relevance for the IEEE 802.15.6 standard currently under development, and/or for Body Area Networks including MBANs.

Multiple access refers to the possibility for multiple network devices in a wireless network to share the same radio channel. To enable multiple access, wireless networks are generally organised either based on frequency division (where transmissions from respective network devices are kept separate by using different frequencies) or on time division (where transmissions are separated by being performed at different times). It is possible to employ both frequency and time division at the same time. For the remainder of this description, reference will be made to time-division schemes although as the skilled person will realise, techniques analogous to those described may be applied also in the frequency-division case.

Time-division based networks typically divide time into equal time intervals called "frames". Various protocols have been devised which provide more or less reliability of communication (by which is meant the probability of a given transmission being successfully received) in accordance with the amount of information available to the network devices. One such protocol is called ALOHA, also called "pure ALOHA", and is suited for wireless networks in which the network devices have no knowledge either of each other or of a predetermined time reference.

In a network using the pure ALOHA protocol, any network device may initiate a data transmission at any random time within a time frame. Because of the random times at which a network device may initiate a data transmission, two or more network devices may initiate a data transmission at overlapping times, resulting in a "collision."

Transmissions involved in such collisions arrive at a receiver with errors. After a suitable delay without receiving acknowledgments confirming successful reception, the transmitters retry the transmissions. In turn, these transmissions may also encounter collisions and therefore may also be unsuccessful. The terminals continue transmitting with suitable delay between transmissions, until the transmissions are received without error and acknowledged. Collisions reduce the throughput efficiency of the network.

One important variation of the Aloha protocol is called "slotted ALOHA." A communication network using a slotted ALOHA divides each frame into a series of time slots and (generally) allows each network device to transmit at will using any of the slots. All data transmissions from any network device must begin and end within a time slot. If a network device has a data transmission which is longer than a time slot period, then it must break the data transmission up into two or more shorter data transmissions which each fit within a time slot period. Confining transmissions within fixed slots reduces the probability of collisions, thus making communications between network devices more reliable, but does not avoid collisions completely. A drawback of slotted-ALOHA is the need for every network device to be synchronised to the start of each frame, in order to know the slot timings. In practice, this is achieved by the network devices listening to a broadcast timing reference signal or "beacon" at the start of each frame.

An alternative protocol, avoiding the need for a timing reference, is called CSMA-CA for Carrier Sense Multiple Access with Collision Avoidance. In CSMA-CA, whenever a device wishes to transmit within the CAP, it waits for a random period. If the channel is found to be idle, following the random backoff, the device transmits its data. If the channel is found to be busy following the random backoff, the device waits for another random period before trying to access the channel again.

A further protocol known as TDMA for Time Division Multiple Access requires a network controller or coordinator to allocate time slots for the exclusive use of network devices so as to avoid the potential for collisions. However, this requires not only that a central coordinator be provided but also that all network devices listen for a beacon and for notification of the slot(s) allocated to them before starting transmission.

Different protocols may be used in the same network, for example for an uplink (i e data transmissions to a central point such as a coordinator or base station) and downlink (data transmissions to a network device such as sensor) respectively.

In this regard, one proposed protocol for the downlink of a WSN is called Wise MAC for Wireless sensor MAC. This is a beacon-less scheme which involves each network device listening to the radio channel for a short time with the same constant period. If a network device detects activity it continue to listen until a data frame is received or until the channel becomes idle again. Meanwhile, the coordinator adds a wake up preamble in front of every data frame, to ensure that the receiver will be awake when the data portion of the frame arrives. In this way, power consumption of the network devices is kept very low when the channel is idle.

In IEEE 802.15.4, as discussed below, both beacon-enabled and beacon-less topologies are provided for. The beacon-enabled topology uses a combination of protocols, with the concept of the "frame" replace by a "superframe" containing slots for both contention-based access via CSMA-CA, and guaranteed time slots (GTSs) allocated on a TDMA basis for exclusive use of a network device. Whilst this provides for reliable transmission of data by allocation of the GTSs, there is the drawback that the network devices have to remain powered-up ("awake") to listen to the coordinator for timing and slot allocation information.

To summarise, whilst beacon-based communication protocols providing a timing reference and (super-)frame structure allow fewer collisions and thus more reliable communication, this is at the expense of power consumption of the network devices. With beacon-less schemes, on the other hand, although the power consumption can be kept very low during inactive periods, the throughput is less guaranteed and the latency time (delay until obtaining channel access) is higher compared with beacon-based schemes.

The present invention proposes a traffic management scheme for IEEE802.15.6 which allows to prioritise communications to and from network devices in emergency. Before explaining how this scheme works, some more information about the general configuration of an IEEE 802.15.4 network will now be given, as similar configuration is expected to be used for IEEE 802.15.6.

Figure 2:
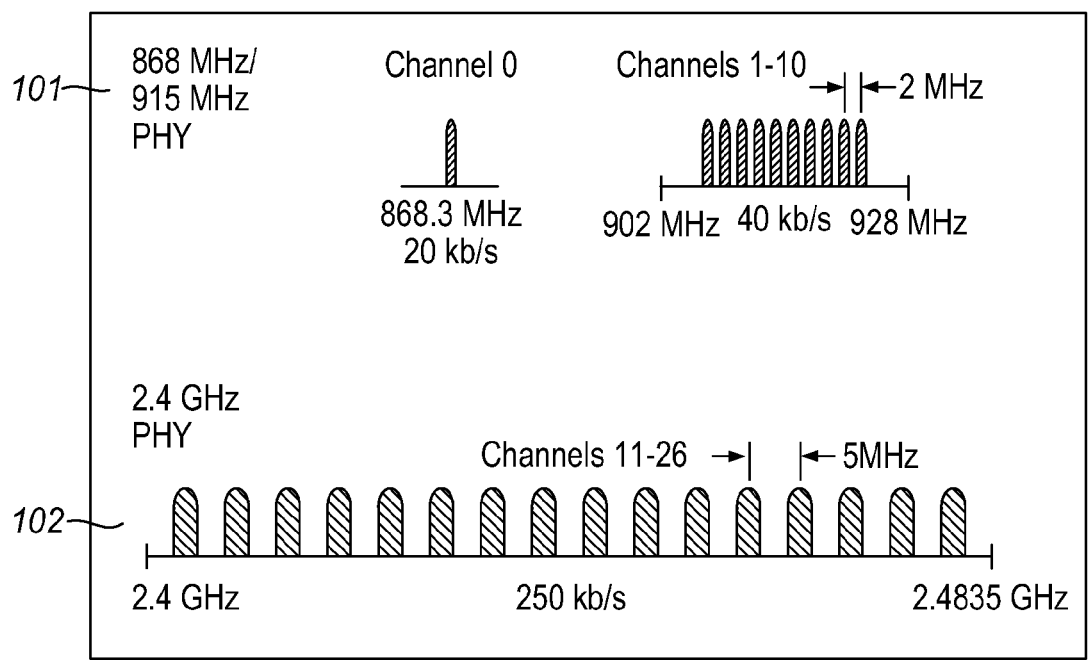
FIG. 2 illustrates possible PHY bands of the IEEE 802.15.4 WPAN.

FIG. 1 shows the general architecture of a IEEE 802.15.4 WPAN, labelled 100, in terms of the layered OSI model, in which the physical medium is accessed via a PHY layer containing the radio transceiver and its low-level control. As shown, there are two alternative frequency bands 101, 102 for the PHY, which are illustrated in FIG. 2. The lower frequency band 101 provides a single 20 kb/s channel centred on 868.3 MHz, and/or ten channels each of 40 kb/s centred on 915 MHz. The higher frequency band 102 provides 16 channels each of 250 kb/s and centred on a frequency of 2.44 GHz. Which of these bands is used will depend on local regulatory requirements.

Access to the PHY is provided by a MAC (Medium Access Control) sublayer indicated by 105 in FIG. 1. Above this, and external to the WPAN 100 as such, are provided a LLC (Link Layer Control) allowing access to the WPAN from other networks; this may be in accordance with the IEEE 802.2 standard, or of another type. Finally, upper layers 109 above the LLC include a network layer to provide network configuration, manipulation, and message routing, and an application layer which provides the intended overall function.

Figure 3:
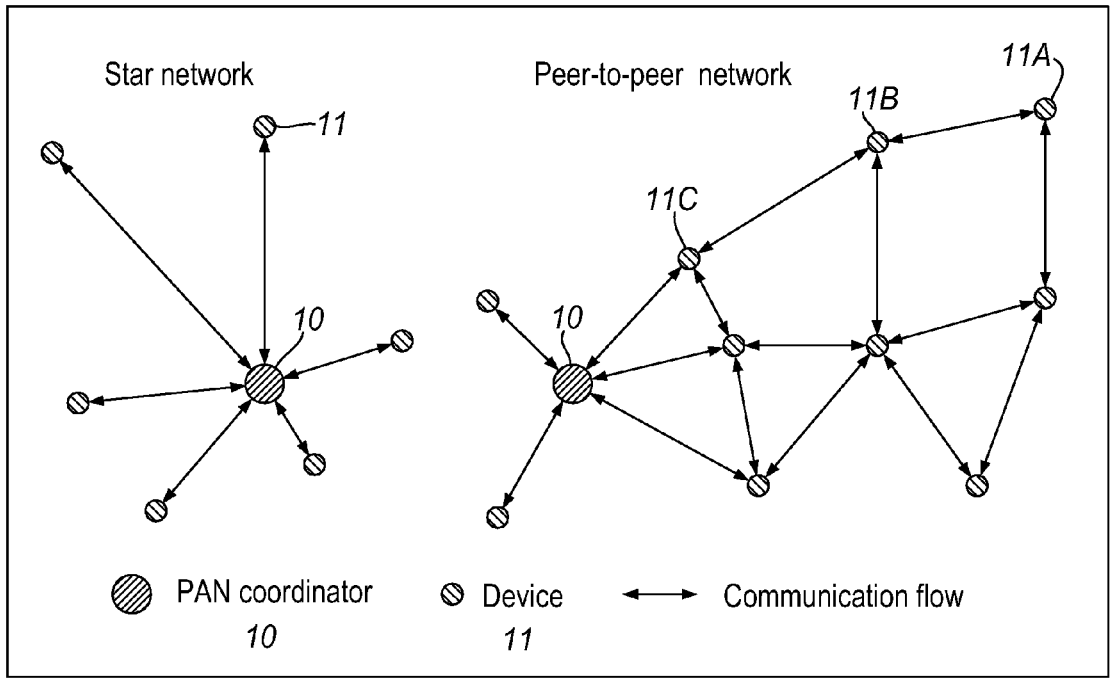
FIG. 3 illustrates Star and Peer-to-Peer topologies of a WPAN.

One task of the MAC sublayer is to control the network topology. Star and peer-to-peer are two known topologies in communications networks, and both are provided for in IEEE 802.15.4. In both cases, the topology distinguishes between two basic kinds of network node: devices and coordinators. As shown in FIG. 3, in the Star topology a number of devices 11 communicate directly with a central co-ordinator 10; whilst in the peer-to-peer configuration, communications by a device 11A with the communicator are made along one or more hops with intermediate devices 11B and 11C acting as relays. The coordinator acts as the access point to the upper layers; in the case of a WSN, it acts as the sink for the data collected by the sensors. Given that the communication range of each device may be very limited (a few meters), the peer-to-peer topology allows a greater area to be covered. Thus, peer-to-peer may typically be used where some network devices are outside the range of direct wireless communication with the coordinator. The topology may be dynamic, changing as devices are added or leave the network.

In the case of MBANs, for example, a star network would be appropriate in the situation where a coordinator is provided at each patient site (such as a hospital bed), exchanging signals with devices on a single patient. Peer-to-peer would be a more appropriate topology where one coordinator was provided to serve a number of patients (the coordinator might be located at a fixed point in a hospital ward). Thus, whilst the devices 11 will generally be mobile the coordinator may be either mobile or fixed. Peer-to-peer networks may also be more suited to fast-changing environments where it is required to set up or change the network quickly, or to allow self-organisation and self-healing of the network. Self-healing may include, for example, establishing a new coordinator in the event that an existing coordinator has failed or left the network.

Multiple star and/or peer-to-peer networks may be set up in the same location such as a hospital, each with their own coordinator. In this case it will be necessary for the respective coordinators to collaborate in order to avoid mutual interference and to allow sharing or collation of data. In IEEE 802.15.4 such networks are called clusters, and provision is made for establishing an overall coordinator for the clusters as well as for dividing and merging clusters.

Nodes in a WPAN may be constituted by units of varying capabilities. Generally, the role of coordinator will require a relatively capable apparatus with some processing power and transceiver capable of handling transmissions from multiple sources simultaneously. This in turn will necessitate a sufficient provision of electrical power (in some cases, it may be mains powered). On the other hand, other devices in the network may have more limited processing ability and access only to battery power, and may even be so simple as to be unable to act as a relay hop. Devices with very low power availability may be shut down most of the time and only "wake up" occasionally, for example to transmit sensor data to another node. Thus, the IEEE 802.15.4 standard distinguishes between "full-function" and "reduced function" devices. Availability of power is a particular issue for MBANs in which sensors may be implanted within a body and thus unable to have a large or rechargeable battery.

As already mentioned, IEEE 802.15.4 provides for beacon-enabled and non beacon-enabled network topologies.

Figure 4:
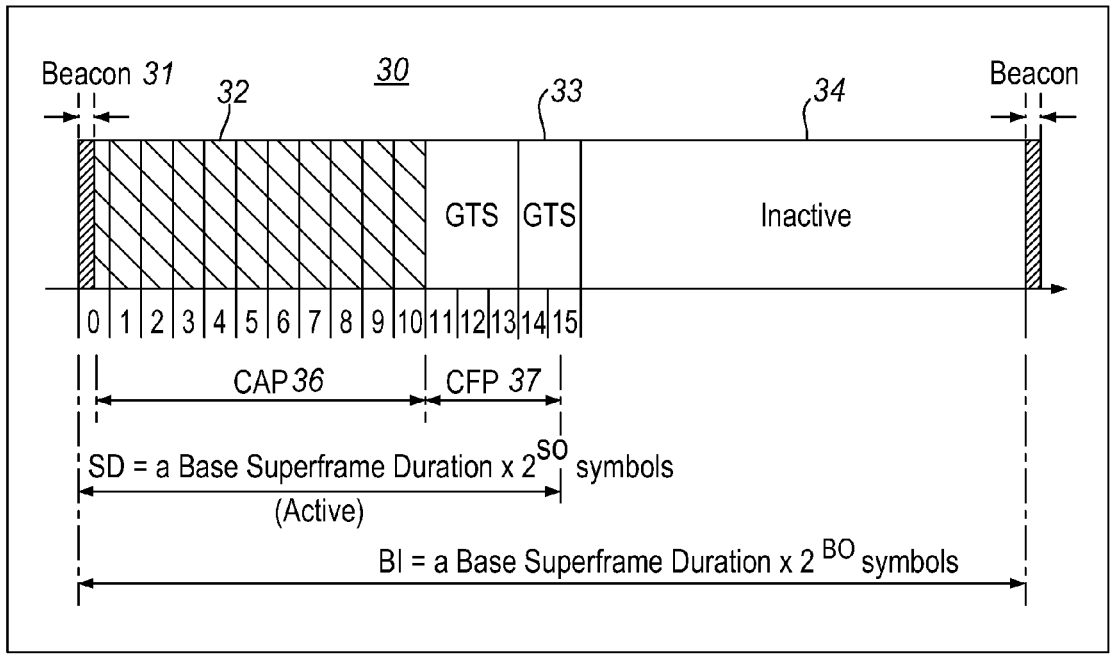
FIG. 4 shows the structure of a superframe in a beacon-enabled IEEE 802.15.4 WPAN.

In a beacon enabled network, the coordinator transmits a beacon periodically and devices listen periodically to that beacon to synchronize to the network and to access the channel. The channel access is in units of "frames" transmitted sequentially within a "superframe" according to a superframe structure as shown in FIG. 4, which is defined by the coordinator. Each superframe 30 consists of two parts: active and inactive. The active part is divided into a contention access period CAP 36, followed by an optional contention free period CFP 37 for guaranteed access for applications with quality of service requirement.

As indicated by the vertical divisions in FIG. 4, the superframe is divided into 16 equally-spaced time slots each capable of carrying a frame of data from the coordinator or from a device. Thus, considering the devices associated with one coordinator, only one device may be in communication with the coordinator at a time during each successive time slot within the superframe. First comes a slot 31 for a beacon frame (see below) transmitted by the coordinator. After this, several slots 32 are provided within the CAP, allowing data transmission to or from devices on a contended basis using CSMA-CA.

Next there follow the guaranteed time slots GTS 33 of the CFP, allowing channel access to devices in a beacon-based network and as shown, each of these may extend over more than one basic time slot. After the expiry of the inactive period, the next superframe is marked by the coordinator sending another beacon frame 31. Devices can go to sleep during the inactive period 34 of the superframe. Thus, by extending the length of the inactive period 34, battery power of devices can be conserved as much as possible.

In the non beacon enabled network, the coordinator is not required to transmit a beacon for synchronization unless it is requested to do so (e.g. for network discovery purposes). The channel access is not restricted by the superframe structure and devices are asynchronous, performing all data transfers by CSMA-CA. They can follow their own sleeping pattern according to a protocol such as WiseMAC.

For an MBAN application, the coordinator is external to the body or bodies being monitored. It may be a PDA, a mobile phone, a bedside monitor station or even a sufficiently-capable sensor which on a temporary basis acts as a coordinator. As mentioned above, the coordinator in the beacon enabled network is in charge of providing synchronization and channel access to network devices. The start and end of a superframe is also defined by a coordinator. The coordinator has two main features of potential communications to other networks and access to a sufficient power supply, for example by easy replacement of the charged batteries.

A central care and monitoring unit may also be provided for overall supervision of a network possibly containing several coordinators. This may take the form of a room with monitoring equipments capable of receiving continuous or occasional streams of emergency data from multiple patients. There will typically be nurses or medical specialists stationed in the central unit who are continuously watching and monitoring the patients' data. They will take actions in response to change in patients' conditions. The central care and monitoring unit may be connected wirelessly to the or each coordinator (in which case it may be considered part of the MBAN) or it may have a wired connection to each coordinator (in which case it may be considered as outside the MBAN as such).

FIGS. 5 to 8 illustrate data transfers between a device and a coordinator in a IEEE 802.15.4 network. Three basic types of transfer are defined in IEEE 802.15.4:

(i) data transfer to a coordinator as recipient to which a device (sender) transmits its data—used in both star and peer-to-peer topologies;

(ii) data transfer from a coordinator as sender in which the device receives the data—used in both star and peer-to-peer topologies; and (iii) data transfer between two peers—used in peer-to-peer networks only.

Figure 5:
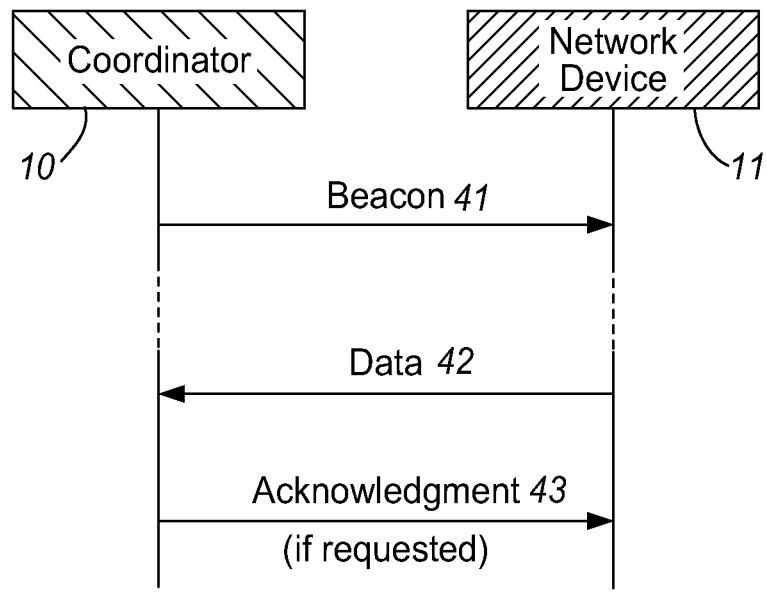
FIGS. 5 to 8 illustrate possible modes of data transfer between a network device and a co-ordinator in a IEEE 802.15.4 WPAN.
Figure 6:
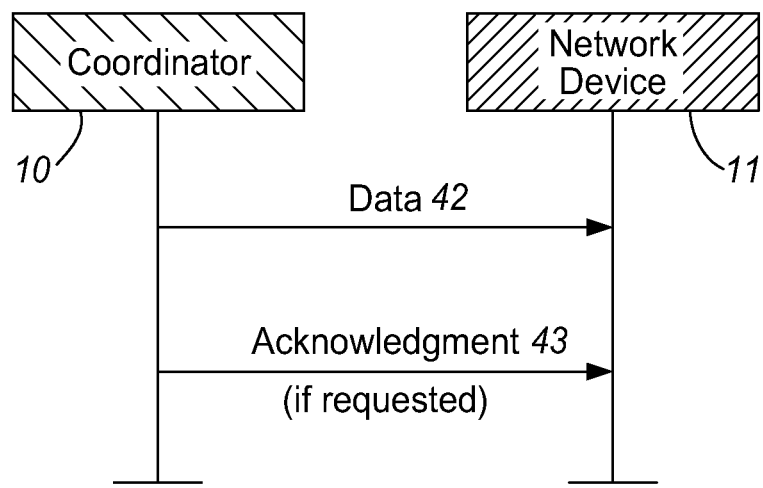

FIGS. 5 and 6 depict a transfer from the device (Network Device 11) and coordinator (Coordinator 10) for both the beacon-enabled and non beacon-enabled case respectively. The difference is that in the beacon-enabled case the device 1 must wait to receive a beacon frame 41 from the coordinator prior to sending the data (data frame 42) using CSMA-CA in the CFP, or using a GTS in the CAP; whilst in the non beacon-enabled case there is normally no beacon frame and the device 11 sends a data frame 42 at will using CSMA-CA. In either case, the coordinator acknowledges the successful reception of the data by transmitting an optional acknowledgment frame or ACK 43. These different types of frame are explained in more detail below.

If the recipient is unable to handle the received data frame for any reason, the message is not acknowledged. If the sender does not receive an acknowledgment after some period, it assumes that the transmission was unsuccessful and retries the frame transmission. If an acknowledgment is still not received after several retries, the sender can choose either to terminate the transaction or to try again. When the acknowledgment is not required, the sender assumes the transmission was successful.

Figure 7:
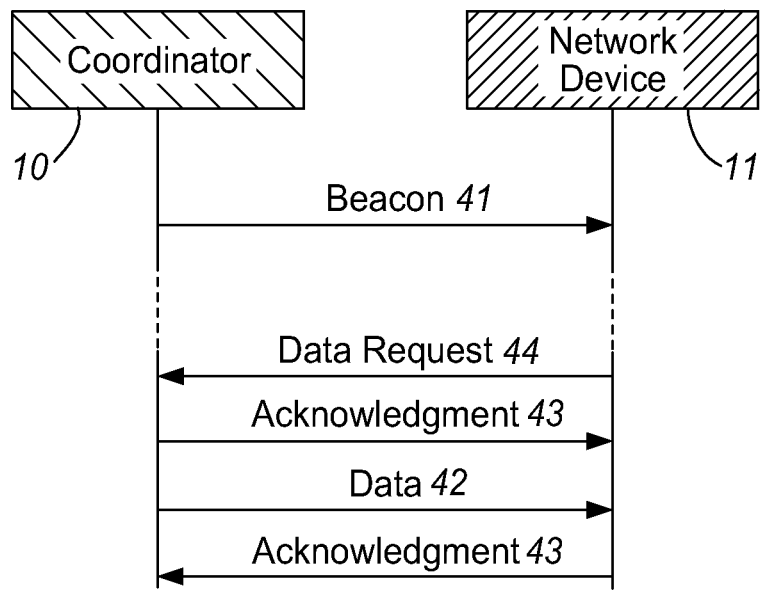
Figure 8:
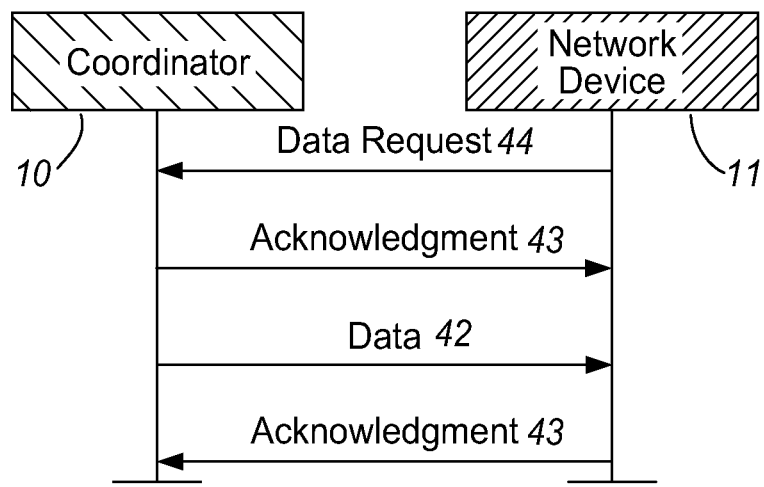

FIGS. 7 and 8 illustrate data transfer from a coordinator 10 to a device 11. When the coordinator wishes to transfer data to a device in a beacon-enabled WPAN (FIG. 7), it indicates in the beacon frame 41 that the data message is pending. The device periodically listens to the beacon frame and, if a message is pending, transmits a data request (MAC command) 44 requesting the data by CSMA-CA. The coordinator 10 acknowledges the successful reception of the data request by transmitting an acknowledgment frame 43. The pending data frame 42 is then sent using slotted CSMA-CA or, if possible, immediately after the acknowledgment. The device 11 may acknowledge the successful reception of the data by transmitting an optional acknowledgment frame 43. The transaction is now complete. Upon successful completion of the data transaction, the message is removed from the list of pending messages in the beacon.

In the non beacon-enabled case, the coordinator 10 which has data ready for a particular device 11 has to wait for a data request 44 from the device concerned, sent on a contention basis. Upon receiving such a request, the coordinator sends an acknowledgement frame 43 (this can also be used to signify that no data is ready, if that is the case), followed by the data frame 42, in response to which the device 11 may send another acknowledgement frame 43 in return.

For simplicity, the above procedures have considered only the above cases (i) and (ii) of data transfers between the device and coordinator, but in a peer-to-peer network, as already mentioned, data transfers will generally take place via mechanism (iii), involving one or more intermediate nodes, which increases the risk of collision and the delays involved.

As indicated in FIGS. 5 to 8, communications in a IEEE 802.15.4 network involve frames of four different types:

beacon frame 41, used by a beacon-type coordinator to transmit beacons data frame 42, used for all transfers of data acknowledgment frame 43, used for confirming successful frame reception MAC command frame 44, used for handling all MAC peer entity control transfers such as data requests.

Figure 9:
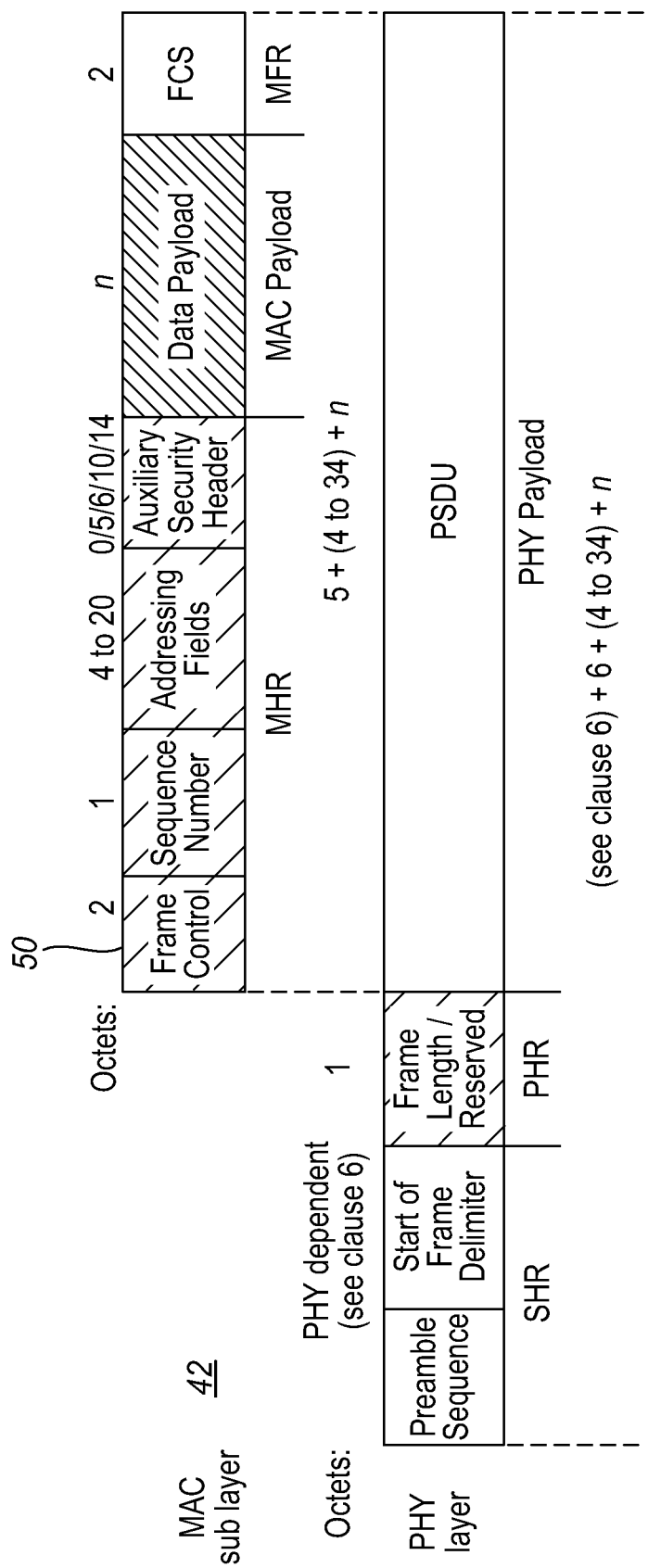
FIG. 9 shows a frame format used for a data frame in a IEEE 802.15.4 WPAN.

The structure of each of the four frame types is quite similar, and is shown in FIG. 9 for a data frame 42 by way of example. In the Figure, the two horizontal bars represent the MAC sublayer and the PHY layer respectively. Time progresses from left to right, and the time length of each successive field of the frame is shown (in octets) above the field concerned. Every frame consists of a sequence of fields in a specific order, these being depicted in the order in which they are transmitted by the PHY, from left to right, where the leftmost bit is transmitted first in time. Bits within each field are numbered from 0 (leftmost and least significant) to k−1 (rightmost and most significant), where the length of the field is k bits.

The data to be sent via the data frame 42 originates from the upper layers. The data payload is passed to the MAC sublayer and is referred to as the MAC service data unit (MSDU). The MAC payload is prefixed with an MAC Header MHR and appended with a MAC Footer MFR. The MHR contains the Frame Control field 50 (see below), data sequence number (DSN), addressing fields, and optional auxiliary security header. The MFR is composed of a 16-bit frame check sequence FCS. The MHR, MAC payload, and MFR together form the MAC data frame, (i.e., MPDU). The MPDU is passed to the PHY as the PHY service data unit PSDU, which becomes the PHY payload. The PHY payload is prefixed with a synchronisation header SHR, containing a Preamble Sequence and a start-of-frame delimiter SFD, and a PHY header PHR containing the length of the PHY payload in octets. The preamble sequence and the data SFD enable the receiver to achieve symbol synchronization. The SHR, PHR, and PHY payload together form the PHY packet (the PHY protocol data unit PPDU).

The beacon frame 41, acknowledgement frame 43 and MAC command frame 44 have a similar structure, except that the MAC payload has a different function in each case, the acknowledgement frame having no MAC payload. Also, the beacon frame 41, the acknowledgement frame 43 and MAC command frame 44 originate in the MAC sublayer without involvement of the upper layers.

The frame control field 50 used in each type of frame is shown in more detail in FIG. 10. It consists of 16 bits assigned to subfields for different purposes as illustrated. In particular, the first three bits of the field denote the Frame Type 51: beacon frame 41, data frame 42, acknowledgement frame 43, or MAC command frame 44. The way the frame type is signified is shown in FIG. 11. Following the frame type bits 51 is a single-bit Security Enabled subfield 52 denoting whether or not security is enabled by the MAC sublayer. This is followed by a Frame Pending subfield 53 to indicate whether the sender has more data for the recipient. Next is an Ack. Request subfield 54 to indicate whether an acknowledgement is requested from the recipient. After this follow some further sub-fields 55, to 59 which are used for addressing purposes or reserved in the current IEEE 802.15.4 specification.

As mentioned, FIG. 11 is a table of the possible bit values for the Frame Type subfield 51, showing that values 100 to 111 are unused in the IEEE 802.15.4 specification.

Having outlined the background of the present invention, some embodiments will now be described with reference to FIGS. 12 to 20, using a medical monitoring scenario as an example.

The present invention addresses, for example, the situation in which patients are being monitored via a MBAN of sensors disposed on or around, or implanted in, each patient's body. Incidentally, in the subsequent description, terms such as "MBAN" or "the network" are used to refer to the totality of wireless devices in a given location, even if it might be possible to define sub-networks within the overall network. For example, in the case of a hospital ward, the sensors and coordinators can be regarded as forming a single network even though the sensors monitoring a single patient could also be regarded as network in their own right.

FIGS. 12 to 16 schematically show nodes in an MBAN which are of three types: a coordinator 10 as described above, and two types of network device as described above, including devices involved in medical monitoring of a patient, and devices 13 for non-medical applications. Among the devices for medical monitoring, it is assumed that at least one such device 11E is "in emergency"; in other words that it is involved with sensing or transferring data from/to a patient in an emergency situation with respect to one or more medical parameters being monitored.

Figure 12:
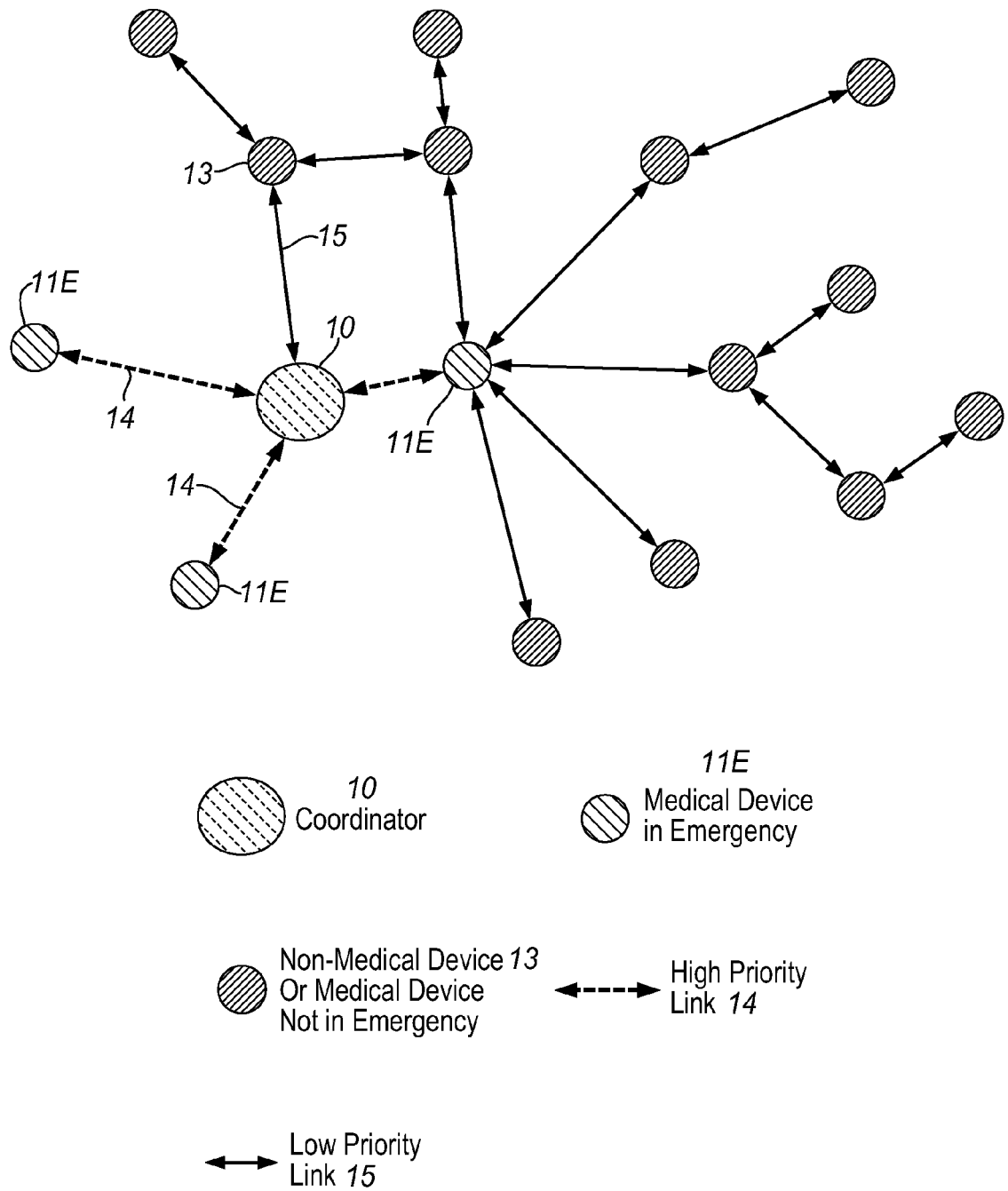
FIGS. 12 to 16 are schematic diagrams of nodes in a WPAN having low-priority and high-priority links defined in accordance with the invention.

As shown in FIG. 12, both star and peer-to-peer topologies are supported. Generally, star topology is preferred for those network devices in range of direct wireless communication with the coordinator; whereas peer-to-peer will be used for those devices outside the range of direct communication.

Two types of topologies and two types of connection links are provided in this embodiment: emergency topology, and non-emergency topology. The former is distinguished from non-emergency topology by having two distinguishing features: 1. Devices in emergency and 2. High priority communications links For the communications and all upcoming channel access procedures emergency topology has a higher priority to the non-emergency topology. The emergency topology is preferably beacon-based, since as explained above this provides the ability for a coordinator to assign GTSs for exclusive use of specific communication links Thus, FIG. 12 illustrates a situation in which the coordinator 10 is simultaneously conducting communications via high-priority links 14 with the devices 11E in emergency through a star topology; and conducting communications via low-priority (or "normal" priority) links 15 with other devices 13 (which could be either medical devices which are not currently involved in an emergency situation, or non-medical devices for which, for present purposes, it is assumed that no emergency state may exist).

Figure 13:
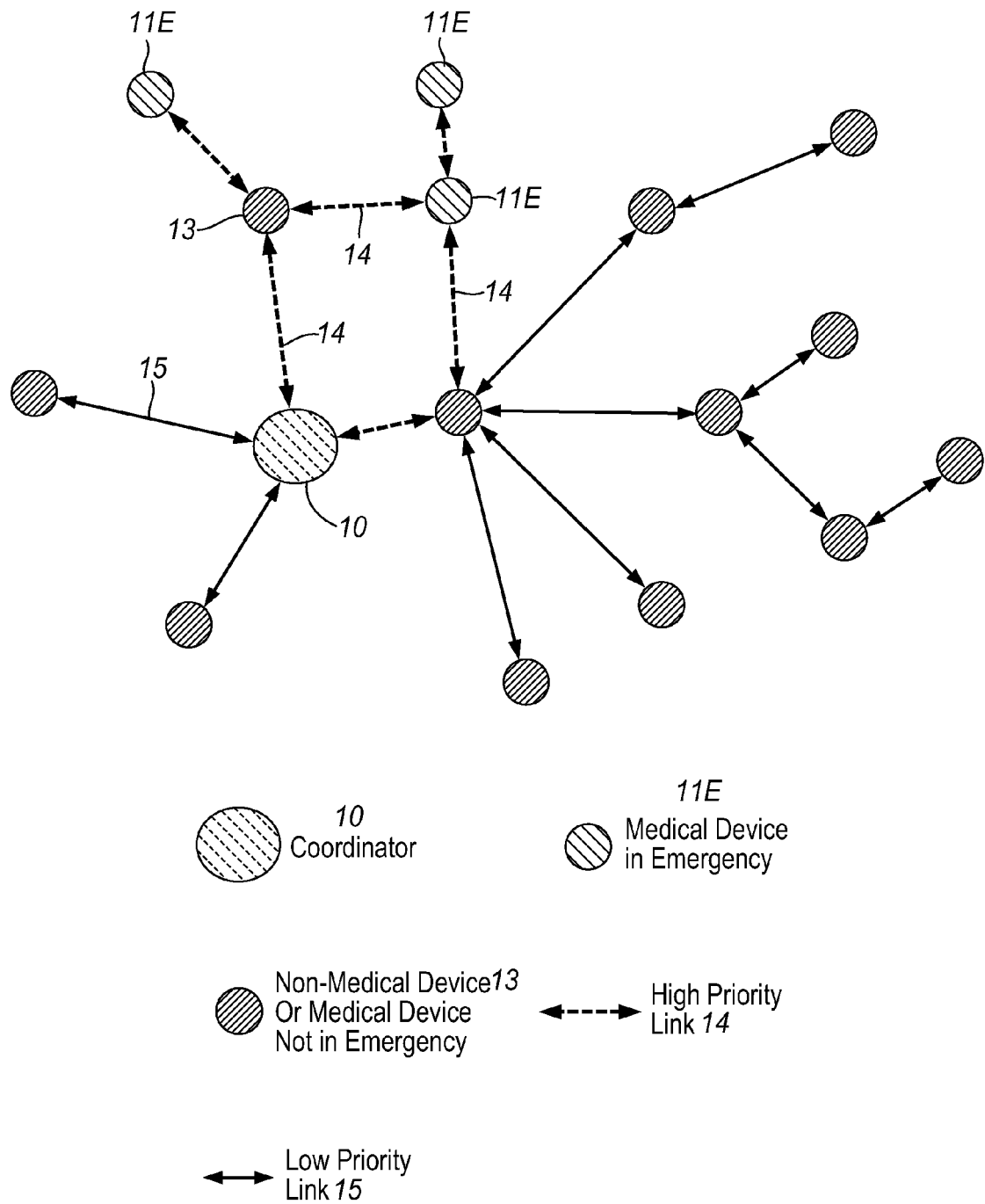

FIG. 13 shows a similar arrangement except that the high-priority links 14 are now via peer-to-peer connections, indicating that both star and peer-to-peer topologies may be used for the high-priority, high-QoS links to devices in emergency. Meanwhile, low-priority links 15 are made by both star and peer-to-peer connections.

Figure 14:
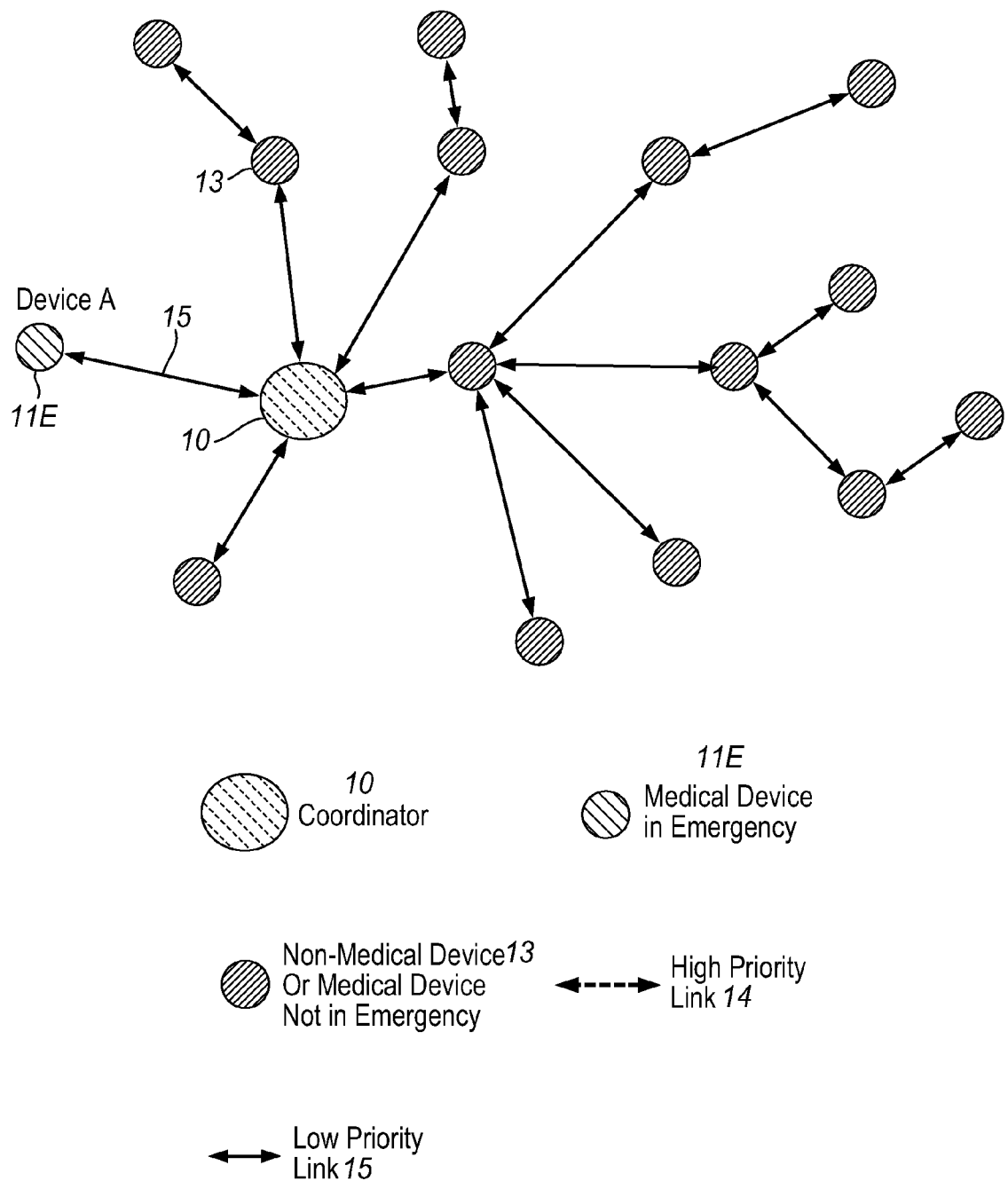
Figure 15:
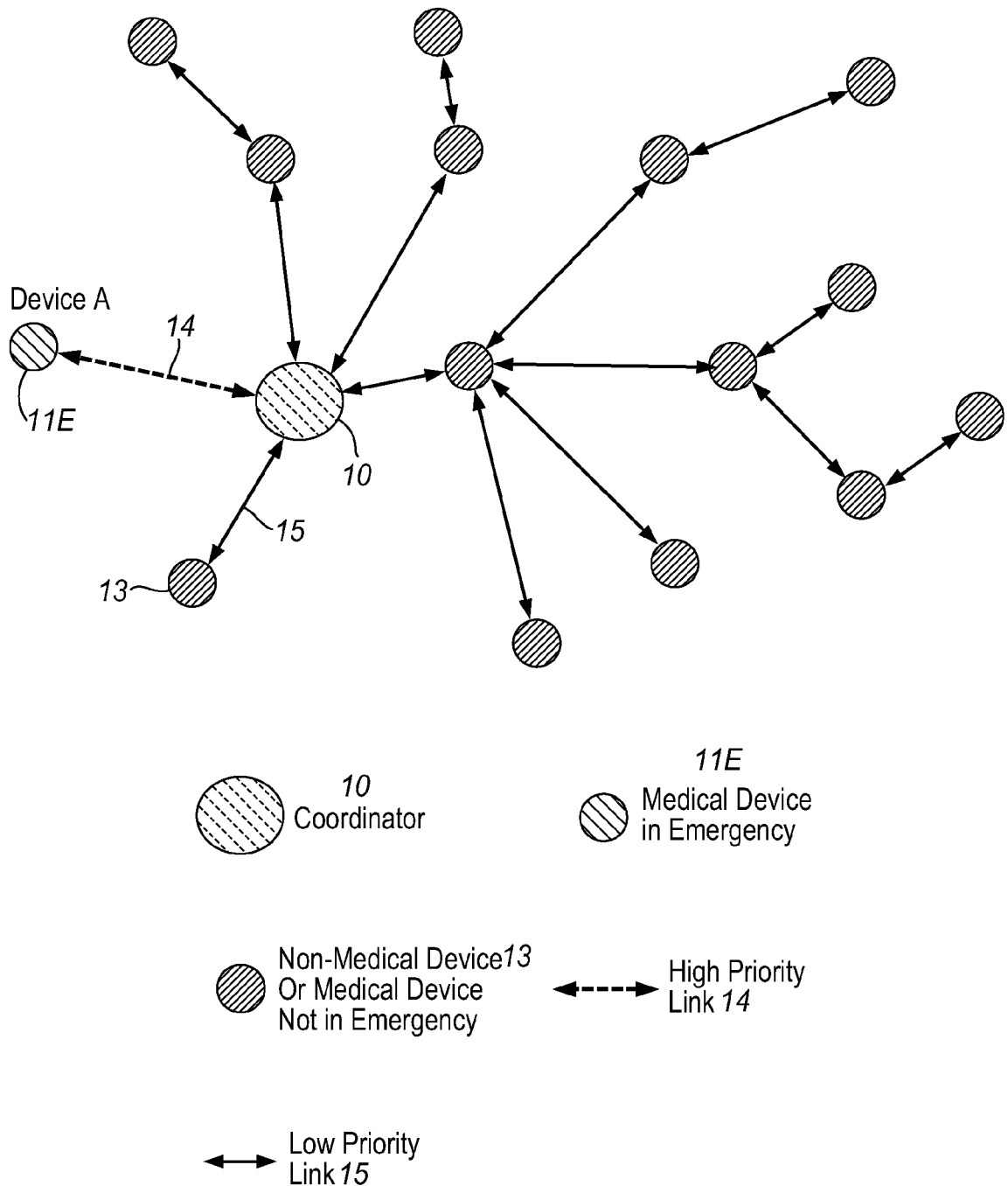

Initially, it may be assumed that none of the network devices is in emergency (for example, in a medical monitoring scenario, where none of a plurality of patients being monitored is in a critical condition). Thus, all links begin in the low-priority mode as shown in FIG. 14. Suppose now that one of the devices 11E (also labelled device A) goes into emergency. For example, it could be a blood-pressure sensor which senses a value of blood pressure outside an acceptable range. The emergency state is recognised and may be signalled to the coordinator in some way (see later for one example). Then, as shown in FIG. 15 the coordinator 10 allocates a high priority link for the medical device 11E in emergency. For example if a Guaranteed Time Slot is to be allocated to the devices using TDMA, device 11E will get the first chance for transmission.

Figure 16:
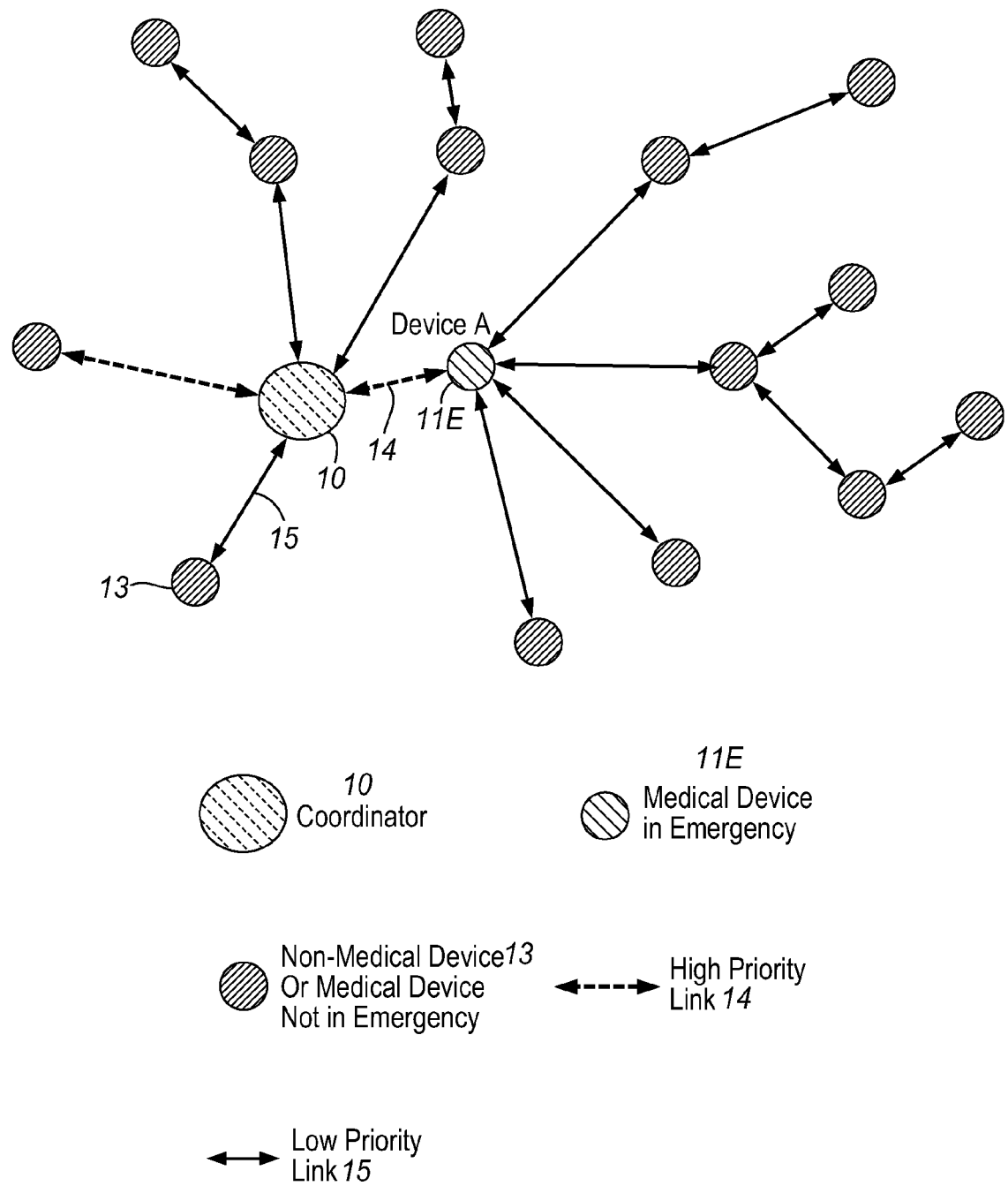

FIG. 16 shows what happens in the case of a peer-to-peer topology where a network device already acting as a relay hop goes into emergency. The protocol is designed with the fact in mind that network device 11E (device A) in emergency should be given a chance to: (a) have less congestion from second hop non-emergency devices; (b) confirm that the other devices also in emergency, and requiring a peer-to-peer route through Device A, will get an emergency access; and (c) be guaranteed a high priority emergency link Thus, as shown in the example of FIG. 16, a high-priority link 14 is set up between the coordinator 10 and network device 11E. In this example, none of the network devices in peer-to-peer communication with device 11E are themselves in emergency so low-priority links 14 are sufficient in this case. To improve the traffic management further it may be possible to divert some of the low-priority traffic through device 11E such that it reaches the coordinator 10 by another route. This will also minimise any unnecessary power consumption in device 1E, which is likely to be using more power than usual due to the emergency state (for example by being required to take sensor readings more often).

Figure 17:
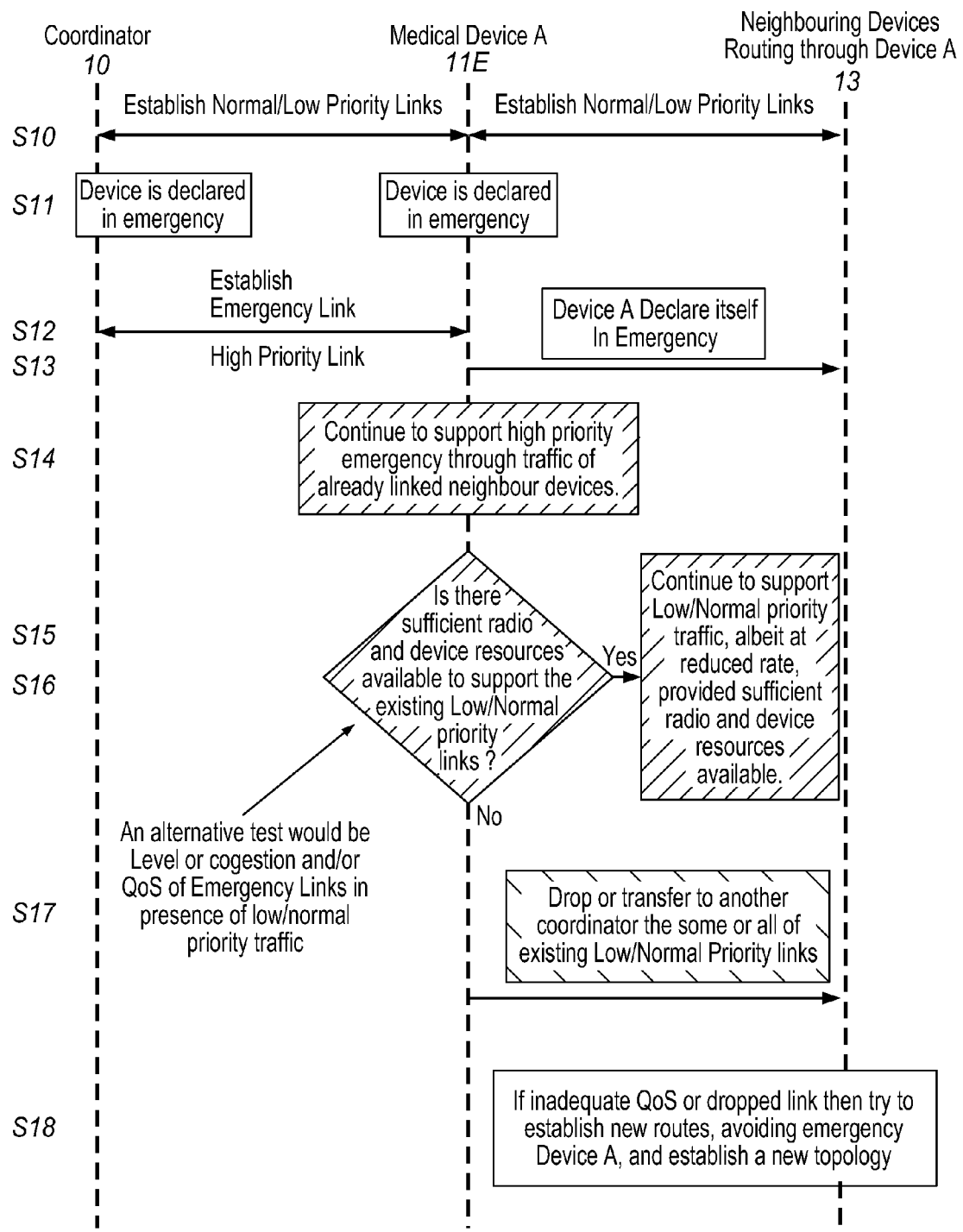
FIG. 17 is a flow diagram for a first protocol embodying the present invention for managing high-priority links and low-priority links.

FIG. 17 shows the process flow in the above traffic management protocol. In this Figure (and in FIG. 18), the vertical columns represent each of the devices involved in the protocol: the coordinator 10, the network device (to be) in emergency 11E, and other devices such as non-medical/non-emergency devices 13. The vertical direction represents the flow of time. The process proceeds as follows:

S10: It is assumed that all devices start in the non-emergency state and thus have low-priority (either star or peer-to-peer) connections with the coordinator 10.

S11: Device 11E is declared to be in an emergency state. This could occur in a number of ways, which are outside the scope of this specification but are described in a co-pending application by the same applicant. A typical scenario would be that a value sensed by a sensor of the network device itself reaches some kind of critical value. In any case, it is assumed that both coordinator 10 and device 11E recognise and declare that device 11E is "in emergency"; for example, that it is involved in sensing a medical parameter which is at some critical level such as to require intensive monitoring.

S12: The coordinator 10 and the device 11E in emergency, in response to the emergency state being declared (which declaration could in fact have come from the coordinator itself) co-operate to establish an emergency link (high-priority link) For example, the coordinator may inform the device 11E which GTS to use for its transmissions.

S13: If the other devices are not already aware of it, the device 11E declares the emergency state to other devices whose communications are currently being routed through device 11E (device A). This declaration could in fact originate in coordinator 10 for passing on to the other peer-to-peer-connected devices through device 11E.

S14: The network device 11E is currently in the situation, as shown in FIG. 16, of supporting the communications links of its peer-to-peer-connected other devices. If any of these other devices are themselves in emergency, device 11E continues to do so.

S15: On the other hand device 11E checks whether it has enough resources (both in terms of radio channel, and battery power) to maintain existing low-priority links with the other peer-to-peer devices. Alternatively, or in addition, device 11E checks what the effect would be, in terms of level of congestion or QoS on the emergency links(s), of maintaining the low-priority traffic.

S16: If the answer in step S15 is Yes (enough resources available), the device 11E continues to support the low-priority links, albeit at a reduced rate, provided that sufficient radio and device resources are available. For example, the declaration of emergency with respect to device 11E may mean that device 11E must send sensor data more frequently to the coordinator 10, which both takes up part of the available space on the uplink and uses battery power.

S17: If the answer in S15 is No (not enough resources available), the device 11E drops some of its existing low-priority peer-to-peer links with the other devices 13, preferably by transferring them to another coordinator to avoid loss of data. Depending on the implementation, it may be possible for some or all of the other network devices 13 to act as a secondary coordinator. Alternatively, the device 11E may reduce the resources devoted to the low-priority links, e.g. by reducing the data rate of each link.

S18: Meanwhile, the other devices 13 may themselves detect a reduced QoS as a result of traffic prioritisation by the device 11E and coordinator 10. In this event, the other devices 13 may themselves try to initiate a change in the topology, for example by attempting to find an alternative route for peer-to-peer communications which avoids the device 11E.

Depending on the capability of the network devices, it may not be possible for device 11E in emergency to take the decisions required in steps S15-S17, or for the other devices 13 to take the action in step S18. In this case the coordinator 10 may take over these steps and inform the results as necessary to the network devices. Alternatively, or in addition, the protocol may be simplified as follows.

Figure 18:
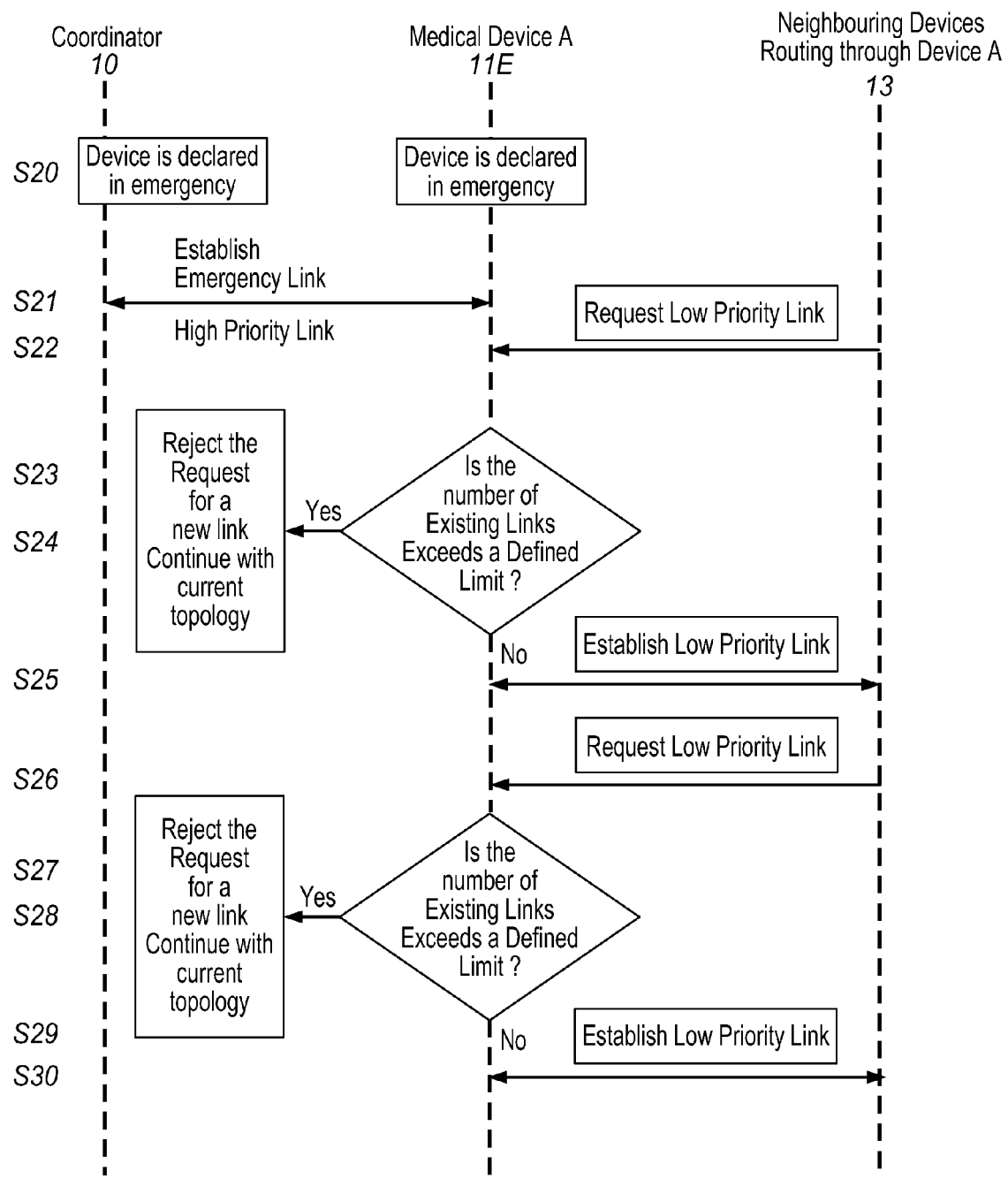
FIG. 18 is a flow diagram for a second protocol embodying the present invention for managing high-priority links and low-priority links.

FIG. 18 shows a simplified protocol which may alternatively be applied in the above situation of the device 11E going into emergency. In this protocol, device 11E does not inform the other neighbouring devices about its emergency status. It does not allow any high-priority peer-to-peer links, meaning that only a low priority link will be granted to other devices which want to communicate through any device in emergency. Instead, device 11E controls the number of requested links The procedure is as follows:

S20: As before the device 11E is declared to be in emergency, perhaps by the coordinator 10.

S21: Thus, the coordinator 10 and device 11E establish a high-priority link between them.

S22: Suppose now that a request is received from some other device 13 for a low-priority link S23: Device 11E checks whether the number of its existing links with other devices exceeds (or has reached) a predetermined limit Even a relatively simple network device should be able to find this out, for example by maintaining a count in a counter.

S24: If the answer to S23 is Yes, i.e. the limit has been exceeded, the device 11E rejects the request for a link, and continues operating in accordance with the current topology. This will help to reduce flow of traffic through the medical emergency device, and reduce the number of relay transmissions or retransmissions the medical device in emergency is supposed to handle leading to a collision and congestion avoidance within the medical emergency device.

S25: On the other hand if the answer to S23 is No, the device 11E grants the requested low-priority link S26 to S30: the process of steps S23 to S25 can be repeated any number of times until the predetermined limit on the number of links has been reached.

Some description will now be given of how the above protocols may be accommodated within a communications standard, like IEEE 802.15.6 currently under development, drawn from IEEE 802.15.4.

FIGS. 19 and 20 illustrate a possible modification to the IEEE 802.15.4 frame format in one embodiment of the present invention, to accommodate the emergency situation through the addition of a new bit labelled "emergency" and make it suitable for IEEE 802.15.6. In this modification, allowance is made for a novel emergency frame type but without making any other changes to the frame types in IEEE 802.15.4.

As already outlined, IEEE 802.15.4 provides various frame types including beacon frame 41, data frame 42, acknowledgement frame 43 and MAC Command frame 44. In IEEE 802.15.6, one way to implement the above-described procedures is to introduce a further frame type, the emergency frame, in order to declare the emergency state (or non-emergency state) to the destination device.

FIG. 19 shows the structure of a Frame Control Field 500, corresponding to the Frame Control Field 50 of FIG. 10 already proposed for IEEE 802.15.4. As will be seen by comparing FIG. 19 with FIG. 10, bits 0-2 denote the frame type 501 as in IEEE 802.15.4, but the possible frame type values are changed as shown in FIG. 20. Of the previously reserved values 100-111 (see FIG. 10), bit value "111" is now used to denote the novel emergency frame type. Values 100 to 110 remain as reserved values for future use.

In the remaining subfields of the frame control field 500, basically the same components are present as in the frame control field 50 of FIG. 10, except that bit no. 7 is newly used as a flag for the emergency state (for example: "1"=emergency and "0"=no emergency). Bit 8 is now used to represent an Ack policy (corresponding to the Ack request subfield of FIG. 10). The subfields for security enabled bit 502, Frame Pending bit 503, PAN ID compression 506, destination addressing mode 507, frame version 508 and source addressing mode 509 have the same functions as their counterparts in IEEE 802.15.4 frame control field 50.

To summarise, an embodiment of the present invention may provide the following features and advantages:
- Use of link priority assignment through an "emergency" status bit in the MAC frame control header to determine link priorities.
- The topology is managed in a way that medical devices in range and under emergency within a star topology and no active connection to other devices get a high priority emergency link automatically and the first GTS (or one of early GTSs) in a beacon mode (e.g. TDMA-ALOHA) channel access mode.
- A diversion protocol which lets the low priority devices avoid including a high priority medical emergency device as a relay within their route.
- A congestion and collision avoidance mechanism/protocol which makes the emergency medical device, which is acting as an intermediate hop node for neighbour sensor devices, reduce its traffic load of low/normal priority traffic and in severe cases even drop Low or Normal priority links.
- The proposed protocol enables improved support for handling medical emergency situations.

INDUSTRIAL APPLICABILITY

Embodiments of the present invention may have a vital role to play in facilitating emergency management by use of MBANs. The following scenarios may be noted:

(i) Hundreds of millions of patients worldwide with cardiac and heart problems can be monitored in hospital or at home by employing wireless sensors forming an MBAN on their bodies. The MBAN can provide extra mobility for such patients. However, for this group of patients under situations such as abnormal heart functioning or more severe cases such as heart attack, it is vital to secure a reliable communication channel to make sure that no emergency or alarm signal will be missed. The present invention provides a secure emergency trigger mechanism to make all the entities involved aware about an emergency by sending an "Emergency Acknowledge".

(ii) Hundreds of millions of people worldwide suffer from diabetes. Implantable or non-invasive methods for glucose measurement have been considered recently. An MBAN can be used to monitor a patient's glucose level information on a 24-hour basis. There are situations where the patient's glucose level is off the chart and emergency geolocation and other necessary urgent medical procedures for the patients are required.

(iii) MBANs may be used to gather sensed data while monitoring a patient in intensive care where the loss of data could be life threatening.

(iv) Improves the labour costs and efficiency of emergency response in a medical system.

(v) Improves the emergency awareness in a medical MBAN system.

(vi) Reduces the labour costs by automating the emergency response process.

(vii) Although primarily envisaged for low data-rate applications, MBANs could have application to transfer of streaming video/audio data where loss of individual packet is crucial and affects the quality. Erroneous data may have a negative impact on the diagnosis of illness in emergency cases.

(viii) For medical diagnosis, MMR or X-ray images need to be very clear in order for the doctor to diagnose properly the patient. Again, therefore, reliable data transfer is essential.

In summary, the present invention can provide a technique for operating a wireless sensor network having a plurality of network devices including sensors for monitoring a plurality of parameters, and a coordinator for communicating with the network devices either directly in a star protocol or indirectly in a peer-to-peer protocol, comprising:
arranging the coordinator for communication over a low-priority link with at least a subset of the network devices;
gathering sensor data by sensors of the network devices and transferring the data to the coordinator;
detecting existence of an emergency state with respect to at least one of the network devices;
establishing a high-priority link with the at least one of the devices in the emergency state, the high-priority link having higher priority for network resources than the low-priority link; and
where the one device is acting as a relay hop node for low-priority links with other devices, maintaining, modifying or dropping those low-priority links in dependence upon whether or not the other devices are in emergency, a level of congestion or QoS of the high-priority link, and/or the electrical power available to the one of the devices. The technique may be applied, for example, to monitoring of patients in a hospital using MBANs operating in accordance with IEEE 802.15.6.

The present invention may take the form of a novel network device (sensor), coordinators, or hardware modules for the same, and can be implemented by replacing or modifying software executed by processors of the network devices and/or each coordinator.

Thus, embodiments of the present invention may be implemented in hardware, or as software modules running on one or more processors, or on a combination thereof. The invention may also be embodied as one or more device or apparatus programs (e.g. computer programs and computer program products) for carrying out part or all of any of the techniques described herein. Such programs embodying the present invention may be stored on computer-readable media, or could, for example, be in the form of one or more signals. Such signals may be data signals downloadable from an Internet website, or provided on a carrier signal, or in any other form.

Although the above description has referred only to sensors and coordinators in a wireless sensor network, it is possible for a MBAN to include other devices than these kinds. Potentially, some means of intervening in the patient's care, such as a drug dispensing mechanism, could be arranged in the network under wireless control of the coordinator. Thus, the high-priority link need not be confined to control of sensors and their communications, but could be used for example for commands to deliver a drug to the patient to stabilise a life parameter (heart rate, for instance) in an emergency state.

In the above embodiments, it is assumed that the network will initially have low-priority links only and establishing the high-priority link with the device in the emergency state will involve replacing an existing low-priority link with that device by a new high-priority link, the other devices not in emergency being served by low-priority links However, there might be implementations in which under "normal" operating conditions, bandwidth and power are relatively abundant allowing the high-priority link to be the default mode of communication with the coordinator by al network devices. In this case it would be possible for the network to start with high-priority links for all network devices and to downgrade the links for the devices not in emergency to low-priority links, leaving the high-priority link in place for each device in emergency. This could involve a network device which is not itself in an emergency state recognising that some other network device is in emergency, and downgrading its link with the coordinator to give priority to the emergency device.

An MBAN may also be provided with some form of central control and monitoring unit, as already mentioned above, in communication (not necessarily via the MBAN itself) with the coordinators. Such a central control could be involved in declaring the emergency state, for example.

The above description has concerned techniques for determining a medical emergency of a patient, since this is seen as an important application of the present invention. However, it is not the only possible application. Sensors could be used to monitor a living body in non-medical situations. For example, any person at risk (examples: old or frail people, or children; people in dangerous environments, etc.) could be monitored using the same techniques as described above. In this case, the emergency condition would represent some form of physical threat such as an accident. Sensors for such life parameters such as pulse, temperature, acceleration etc. would be of particular use in this situation. In the emergency state it would be desirable to provide a high-priority link where possible, just as in the medical scenario.

There are many possibilities for applying the present invention beyond the BAN of a human or other living body. One possibility is a WSN capable of detecting industrial emergencies such as many potential scenarios in a mission critical industrial environment (for example, power stations). This can apply to multiple control points in a factory environment. For example we may consider temperature sensors in a factory's heating facility or pressure thresholds for food product lines. The dual use of low (normal) and high-priority links in such a WSN may be applied to emergencies in these systems just as for medical emergencies. Thus, the term "entity" in the claims is to be interpreted as covering any such industrial environment in addition to a living being.

Although the above description has referred to IEEE 802.15.4 and IEEE 802.15.6 by way of example, the invention may be applied to any type of frame-based wireless sensor network or MBAN whether or not operating in accordance with IEEE 802.15.6, as well as to other types of BAN which even if not medical body area networks nevertheless have a requirement for improved reliability of communication in emergency situations.

The invention claimed is:

1. A network device for use in a wireless sensor network having a plurality of network devices, each network device including a sensor, for monitoring one or more parameters, and a coordinator capable of conducting communications with the network devices over a low-priority link or a high-priority link, the network device comprises:
   recognizing means for recognizing whether the network device is in an emergency state; and
   responding means responsive to recognition of the emergency state to establish a high-priority link with the coordinator,
   wherein the network device arranged to act as a relay for peer-to-peer communications over a high-priority link or a low-priority link of at least one other the network device.

2. The network device according to claim 1, wherein the recognising means are further operable to recognise whether each the other network device is also in the emergency state.

3. The network device according to claim 2 wherein the responding means are further responsive to recognition of the emergency state with respect to the network device itself to maintain, modify or drop the peer-to-peer communications in dependence upon at least whether each the other network device is in the emergency state.

4. The network device according to claim 3 wherein the responding means are arranged to maintain, modify or drop the peer-to-peer communications in further dependence upon at least one of a QoS or congestion level of the high-priority link and availability of power to the network device.

5. The network device according to claim 3 wherein the responding means are arranged to modify peer-to-peer communications over a low-priority link with another the network device which is not in the emergency state by reducing a rate thereof.

6. The network device according to claim 3 wherein the responding means are arranged to drop peer-to-peer communications over a low-priority link with another the network device which is not in the emergency state.

7. The network device according to claim 3 wherein the responding means are arranged to maintain peer-to-peer communications over a high-priority link with another the network device in the emergency state.

8. The network device according to claim 1 further comprising counting means for maintaining a count of a number of the other network devices for which the network device itself is acting as a relay, and wherein the responding means is further responsive to recognition of the emergency state to refuse a request to act as relay for a further network device in dependence upon the current value of the count.

9. A wireless sensor network comprising:
   a plurality of network devices, each network device including a sensor, for monitoring a plurality of parameters; and
   a coordinator for communicating with the network devices either directly in a star protocol or indirectly in a peer-to-peer protocol, wherein the coordinator is arranged for communication over a low-priority link with at least a subset of the network devices and is responsive to a determination of the existence of an emergency state of one or more of the network devices to establish a high-priority link with the one or more of the devices, the high-priority link having higher priority for network resources than the low-priority link, and wherein at least one of the network devices is arranged to act as a relay for peer-to-peer communications over a high-priority link or a low-priority link of at least one other the network device.

10. The wireless sensor network according to claim 9 wherein the emergency state with respect to a network device is recognised when a parameter being sensed by a sensor of the network device reaches a critical value.

11. The wireless sensor network according to claim 10 applied to monitoring medical parameters of a living body.

12. The wireless sensor network according to claim 9 wherein the network resources are structured in a time-division manner to define one or more time slots per unit period, and wherein one or more of the time slots are reserved for use in the high-priority link.

13. The wireless sensor network according to claim 12 wherein the network resources are further structured to define a contention access period per unit period for use by at least the low-priority link.

* * * * *